United States Patent
Tsuneki et al.

(10) Patent No.: US 10,171,013 B2
(45) Date of Patent: Jan. 1, 2019

(54) SERVOMOTOR CONTROL DEVICE

(71) Applicant: FANUC CORPORATION, Yamanashi (JP)

(72) Inventors: Ryoutarou Tsuneki, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/801,563

(22) Filed: Nov. 2, 2017

(65) Prior Publication Data

US 2018/0131297 A1    May 10, 2018

(30) Foreign Application Priority Data

Nov. 7, 2016   (JP) .................................. 2016-217343

(51) Int. Cl.
G05B 11/01    (2006.01)
G05B 23/02    (2006.01)
(Continued)

(52) U.S. Cl.
CPC .................. H02P 3/02 (2013.01); H02P 3/18 (2013.01); H02P 6/08 (2013.01)

(58) Field of Classification Search
CPC .................. H02P 3/02; H02P 3/18; H02P 6/08
(Continued)

(56) References Cited

U.S. PATENT DOCUMENTS 5,598,077 A * 1/1997 Matsubara ........... G05B 19/404
318/568.22

6,566,835 B1    5/2003 Yoshida et al.
(Continued)

FOREIGN PATENT DOCUMENTS

CN    102023612    4/2011
CN    102339038    2/2012
(Continued)

OTHER PUBLICATIONS

Office Action dated Aug. 17, 2018 in corresponding Chinese Patent Application No. 201711064165.5.

Primary Examiner — Eduardo Colon Santana
Assistant Examiner — Gabriel Agared
(74) Attorney, Agent, or Firm — Wenderoth, Lind & Ponack, L.L.P.

(57) ABSTRACT

A servomotor control device that performs static friction correction for a servomotor, including: a position control loop for feedback controlling a position of a servomotor; a speed control loop for feedback controlling speed of the servomotor; a position command creation part that creates a position command value for the servomotor; a stop determination part that determines whether or not the servomotor is stopped; a static-friction correction amount calculation part that calculates a static-friction correction amount of the servomotor; and a static-friction correction amount modification part that performs a predetermined modification on the calculated static-friction correction amount, in a case of the servomotor stopping, and then starting to operate in the same direction as prior to stopping. The static-friction correction amount modification part performs a predetermined modification based on the command acceleration of the servomotor obtained from the position command value created by the position command creation part.

8 Claims, 2 Drawing Sheets

(51) Int. Cl.
*H02P 3/02* (2006.01)
*H02P 3/18* (2006.01)
*H02P 6/08* (2016.01)

(58) Field of Classification Search
USPC .................................................. 318/565, 631
See application file for complete search history.

(56) References Cited

U.S. PATENT DOCUMENTS

2001/0054876 A1* 12/2001 Fujita ................... G05B 19/404
  318/600
2002/0156541 A1 10/2002 Yutkowitz

FOREIGN PATENT DOCUMENTS

| CN | 104157179 | 11/2014 |
| CN | 104808699 | 7/2015 |
| JP | 5-282019 | 10/1993 |
| JP | 11-353012 | 12/1999 |
| JP | 2000-10635 | 1/2000 |
| JP | 2003-323216 | 11/2003 |
| JP | 2005-170257 | 6/2018 |
| WO | 01/29628 | 4/2001 |

* cited by examiner

SERVOMOTOR CONTROL DEVICE

This application is based on and claims the benefit of priority from Japanese Patent Application No. 2016-217343, filed on 7, Nov. 2016, the content of which is incorporated herein by reference.

BACKGROUND OF THE INVENTION

Field of the Invention

The present invention relates to a servomotor control device.

Related Art

Conventionally, a technique has been presented for servomotor control devices that tries to prevent the rise in speed from being delayed preemptively, when the servomotor which is the control target starts operating from a stopped state, by performing so-called static-friction correction (for example, refer to Patent. Documents 1, 2 and 3). Upon performing such static-friction correction, the static-friction correction amount has been added to the speed command value (command speed) of a speed control loop.

Patent Document 1: PCT International Publication No. WO2001/029628

Patent Document 2: Japanese Unexamined Patent Application, Publication No. H5-282019

Patent Document 3: Japanese Unexamined Patent Application, Publication No. 2000-10635

SUMMARY OF THE INVENTION

However, as this static-friction correction amount, a fixed value independent of the command acceleration of the servomotor is adopted. In this case, there has been a risk of excess or deficiency occurring in the speed command value of the speed control loop, and the static-friction correction of the servomotor not necessarily being suitably carried out.

The present invention takes account of such a situation, and has an object of providing a servomotor control device capable of suitably performing static-friction correction of a servomotor, in a case of this servomotor starting to operate in the same direction as prior to stopping from a stopped state.

According to a first aspect of the present invention, a servomotor control device (e.g., the servomotor control device 1 described later) includes: a position control loop (e.g., the position control loop L1 described later) for feedback controlling a position of a servomotor (e.g., the servomotor 12 described later); a speed control loop (e.g., the speed control loop L2 described later) for feedback controlling speed of the servomotor; a position command creation part (e.g., the position command creation part 2 described later) that creates a position command value for the servomotor; a stop determination part (e.g., the stop determination part 3 described later) that determines whether or not the servomotor is stopped; a static-friction correction amount calculation part (e.g., the static-friction correction amount calculation part 5 described later) that calculates a static-friction correction amount of the servomotor; and a static-friction correction amount modification part (e.g., the static-friction correction amount modification part 6 described later) that performs a predetermined modification on the static-friction correction amount calculated by the static-friction correction amount calculation part, in a case of the servomotor stopping, and then starting to operate in the same direction as prior to stopping, in which the static-friction correction amount modification part performs the predetermined modification, based on the command acceleration of the servomotor obtained from the position command value created by the position command creation part.

According to a second aspect of the present invention, in the servomotor control device as described in the first aspect, the stop determination part may determine whether or not the servomotor is stopped, using the position command value created by the position command creation part.

According to a third aspect of the present invention, the servomotor control device as described in the first or second aspect may further include an integrator (e.g., the integrator 83 described later) that calculates an integral term based on the speed of the servomotor in the speed control loop, in which the static-friction correction amount calculated by the static-friction correction amount calculation part may be added to the integral term calculated by the integrator.

According to a fourth aspect of the present invention, in the servomotor control device as described in the any one of the first to third aspects, the static-friction correction amount calculated by the static-friction correction amount calculation part may be added to the speed command value of the speed control loop.

According to a fifth aspect of the present invention, in the servomotor control device as described in the any one of the first to fourth aspects, the static-friction correction amount modification part may perform the predetermined modification by multiplying factor determined based on the command acceleration by the static-friction correction amount.

According to a sixth aspect of the present invention, in the servomotor control device as described in the any one of the first to fourth aspects, the static-friction correction amount modification part may perform the predetermined modification by multiplying a factor determined based on the command acceleration by the static-friction correction amount, and further adding thereto an addition amount determined based on the command acceleration.

According to a seventh aspect of the present invention, in the servomotor control device as described in the fifth or sixth aspect, the factor may be proportional to the command acceleration.

According to an eighth aspect of the present invention, in the servomotor control device as described in the fifth or sixth aspect, the factor may be proportional to the square root of the command acceleration.

According to the present invention, in a servomotor control device, it is possible to perform static-friction correction in accordance with the command acceleration of a servomotor, in the case of this servomotor starting to operate in the same direction as prior to stopping from a stopped state. Therefore, even if the command acceleration of the servomotor changes, it is possible to decrease the locus error during starting of the servomotor, and consequently, it becomes possible to suitably perform static-friction correction of the servomotor.

DETAILED DESCRIPTION OF THE INVENTION (Configuration of Embodiment)

Figure 1:
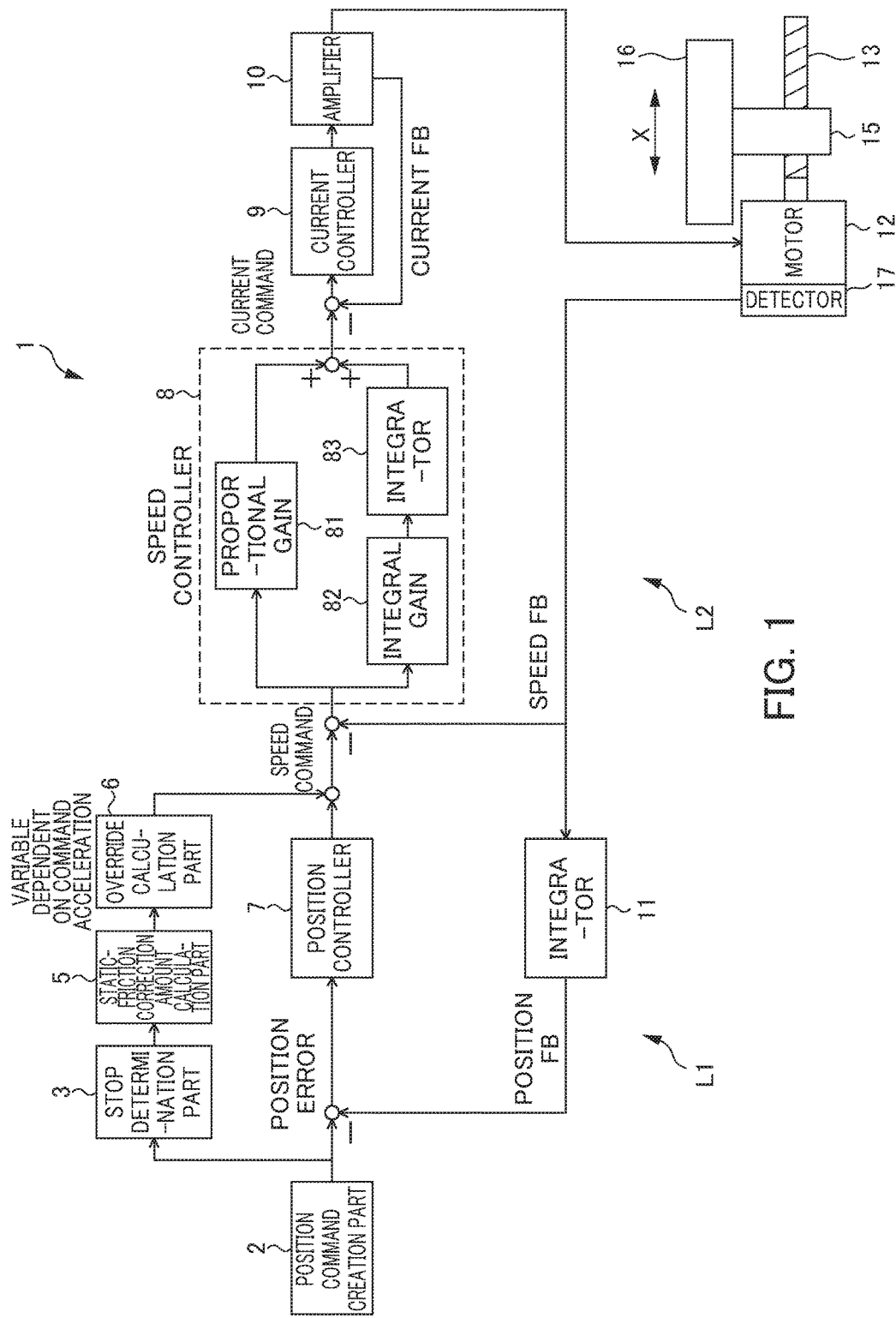
FIG. 1 is a block diagram showing a configuration of a servomotor control device according to an embodiment of the present invention.

Hereinafter, an example of an embodiment of the present invention will be explained. FIG. 1 is a block diagram showing the configuration of a servomotor control device according to the embodiment of the present invention.

As shown in FIG. 1, a servomotor control device 1 includes a position control loop L1, speed control loop L2, position command creation part 2, stop determination part 3, static-friction correction amount calculation part 5, override calculation part 6 serving as a static-friction correction amount modification part, position controller 7, speed controller 8, current controller 9, amplifier 10, integrator 11, servomotor 12, ball screw 13, nut 15, table 16 and detector 17. Furthermore, a proportional gain 81, integral gain 82 and integrator 83 are built into the speed controller 8. Herein, the integration gain 82 and integrator 83 are connected in series, and this integral gain 82 and integrator 83 are connected with the proportional gain 81 in parallel.

The position control loop L1 is for feedback controlling the position (specifically, rotation angle) of the servomotor 12. The speed control loop L2 is for feedback controlling the speed (specifically, rotational speed) of the servomotor 12.

The position command creation part 2 creates a position command value for the servomotor 12. The stop determination part 3 determines whether or not the servomotor 12 is stopped using the position command value created by the position command creation part 2. The static-friction correction amount calculation part 5 calculates the static-friction correction amount of the servomotor 12, and adds to the speed command value of the speed control loop L2.

The override calculation part 6 performs a predetermined modification on the static-friction correction amount calculated by the static-friction correction amount calculation part 5, based on the command acceleration (specifically, command rotational acceleration) of the servomotor 12 obtained from the position command value created by the position command creation part 2, in a case of the servomotor 12 stopping, and then starting to operate in the same direction as prior to stopping. For example, this predetermined modification is performed by multiplying a factor k determined based on the command acceleration of the servomotor 12 by the static friction correction amount. Alternatively, this predetermined modification is performed by multiplying the factor K determined based on the command acceleration of the servomotor 12 by the static friction correction amount, and further adding thereto an addition amount determined based on the command acceleration of the servomotor 12.

The position controller 7, by the position error from the position command creation part 2 being inputted in the position control loop L1, outputs a speed command corresponding thereto to the speed controller 8.

The speed controller 8, by the speed command from the position controller 7 being inputted in the speed control loop L2, outputs a current command corresponding thereto to the current controller 9. The integrator 83 in this speed controller 8 calculates the integral term based on the speed of the servomotor 12 in the speed control loop L2. Then, the speed controller 8, when outputting the current command to the current controller 9, adds a value arrived at by multiplying the proportional gain 81 by the speed error to a value arrived at by multiplying the integral gain 82 by the speed error (output value of the integrator 83) and integrating by the integrator 83.

The current controller 9, by the current command from the speed controller 8 being inputted, amplifies an electrical signal corresponding thereto by the amplifier 10 and outputs to the servomotor 12.

The integrator 11 calculates the position by integrating the speed of the servomotor 12 in the position control loop L1, and outputs this integral term to the position controller 7.

The servomotor 12 causes the table 16 to move in a horizontal direction (X direction) via the nut 15, by causing the ball screw 13 to rotate in forward/reverse directions based on the electrical signal from the current controller 9.

The detector 17 detects the speed of the servomotor 12, and outputs the detected speed to the integrator 11 in the position control loop L1, as well as outputting to the speed controller 8 in the speed control loop L2.

(Sequence of Static-Friction Correction)

Figure 2:
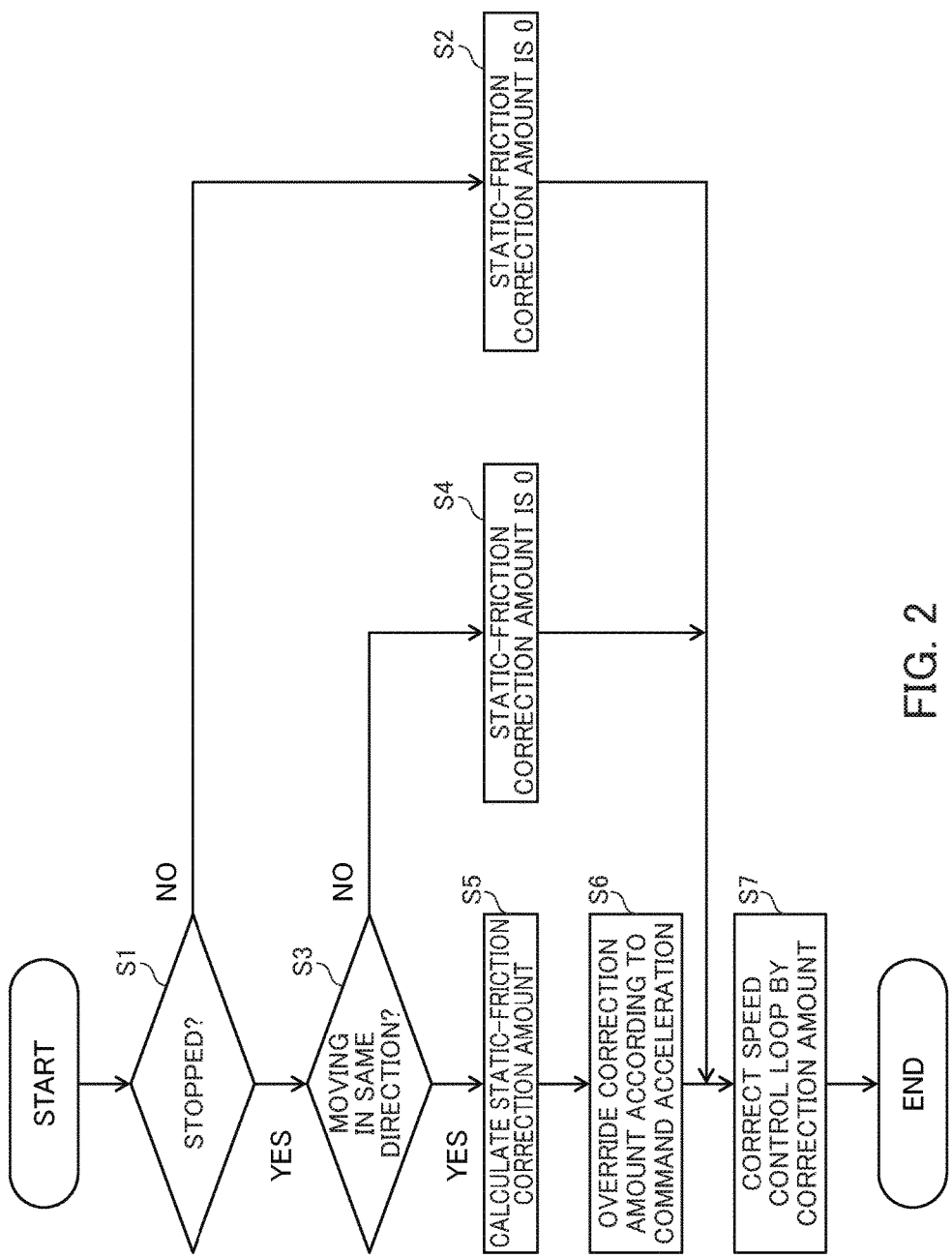
FIG. 2 is a flowchart showing a sequence of static-friction correction for the servomotor control device according to the embodiment of the present invention.

Next, the sequence of static-friction correction of the servomotor control device according to the embodiment will be explained. FIG. 2 is a flowchart showing the sequence of static-friction correction of the servomotor control device according to the embodiment of the present invention.

First, in Step S1, the stop determination part 3 determines whether or not the servomotor 12 is stopped using the position command value created by the position command creation part 2. In the case of this determination being NO, since it is considered that the servomotor 12 is rotating, and a static-friction force is not acting on the servomotor 12, the stop determination part 3 causes the processing to advance to Step S2. In Step S2, the static-friction correction amount calculation part 5 sets the static-friction correction amount of the servomotor 12 as zero. Subsequently, in Step S7, the static-friction correction amount calculation part 5 corrects the speed control loop L2 by this static-friction correction amount (zero). In other words, in the case of the flow of this processing, the static-friction correction is not performed in the speed control loop L2.

Conversely, in the case of the determination in Step S1 being YES, the stop determination part 3 causes the processing to advance to Step S3, and determines whether or not the servomotor 12 is moving in the same direction as prior to stop. In the case of this determination being NO, the stop determination part 3 causes the processing to advance to Step S4. In Step S4, the static-friction correction amount calculation part 5 sets the static-friction correction amount of the servomotor 12 to zero. Subsequently, in Step S7, the static-friction correction amount calculation part 5 corrects the speed control loop L2 by this static friction correction amount (zero). In other words, in the case the flow of this processing as well, the static-friction correction is not performed in the speed control loop L2.

Conversely, in the case of the determination in Step S3 being YES (i.e. in the case of the servomotor 12 moving in the same direction as prior to stopping from the stopped state), the stop determination part 3 causes the processing to advance to Step S5. In Step S5, the static-friction correction amount calculation part 5 calculates the static-friction correction amount of the servomotor 12.

Next, in. Step S6, the override calculation part 6 determines a factor k based on a command acceleration (specifically, value from taking the second-order derivative of this position command value) of the servomotor 12 obtained from the position command value created by the position command creation part 2, and override is done by multiplying this factor k by the static-friction correction amount (predetermined modification is performed on the static-friction correction amount). Based on conditions such as the driving characteristic of the servomotor 12, this factor k is determined so as to be proportional to the command acceleration of the servomotor 12, or is determined so as to be proportional to the square root of the command acceleration of the servomotor 12, for example, After override is done on the static-friction correction amount in this way (after predetermined modification is performed on the static-friction correction amount), the static-friction correction amount calculation part 5 corrects the speed control loop L2 by this overridden static-friction correction amount in Step S7. Therefore, in the case of this flow of processing, override is done on the static-friction correction amount depending on the command acceleration of the servomotor 12, and then the speed control loop L2 is corrected.

(Effects of Embodiment)

According to the present embodiment, in the servomotor control device 1, it is possible to perform static-friction correction according to the command acceleration of the servomotor 12, in the case of the servomotor 12 starting to operate in the same direction as prior to stopping from the stopped state, in this way. Therefore, even if the command acceleration of the servomotor 12 changes, it is possible to decrease the locus error during starting of this servomotor 12, and consequently, it becomes possible to suitably perform static-friction correction of the servomotor 12.

Moreover, the stop determination part 3 uses the position command value created by the position command creation part 2 upon determining whether or not the servomotor 12 is stopped, as mentioned above. To begin with, this position command value is essential in order to feedback control the position and/or speed of the servomotor 12. Therefore, by appropriating this position command value, the stop determination part 3 can easily execute determination of whether or not the servomotor 12 is stopped.

In addition, since the static-friction correction amount calculated by the static-friction correction amount calculation part 5 is added to the speed command value of the speed control loop L2 as mentioned above, upon performing static-friction correction for the servomotor 12, it is possible to smoothly execute feedback control for the speed of the servomotor 12 without impediment.

Furthermore, since the static-friction correction amount calculated by the static-friction correction amount calculation part 5 is added to the integral term calculated by the integrator 83 in the speed controller 8, it is possible to execute feedback control of the speed of the servomotor 12 with high precision, upon performing static-friction correction of the servomotor 12.

(Other Embodiments)

Although an embodiment of the present invention has been explained above, the present invention is not to be limited to the aforementioned embodiment. In addition, the effects described in the present embodiment are merely listing the most preferred effects produced from the present invention, and the effects from the present invention are not to be limited to those described in the present embodiment.

In the aforementioned embodiment, upon determining the factor k based on the command acceleration of the servomotor 12, a case has been explained of determining so as to be proportional to the command acceleration of the servomotor 12 or the square root thereof. However, the determination method for the factor k is not necessarily limited thereto, for example, and it may be configured so as to use a first order function (linear function) to associate the command acceleration of the servomotor 12 or square root thereof and the factor k, and determine the factor k from the command acceleration of the servomotor 12 based on the corresponding relationship.

In the aforementioned embodiment, a case has been explained of performing static-friction correction based on the command acceleration of the servomotor 12, limited to a case of the servomotor 12 starting to operate in the same direction as prior to stopping from a stopped state. However, it is possible to similarly apply the present invention also to a case of the servomotor 12 moving in the direction opposite to prior to stopping from the stopped state (during reversal).

In the aforementioned embodiment, although the static-friction correction amount calculation part 5 and override calculation part 6 are provided individually, it is not limited thereto, and the static-friction correction amount calculation part 5 and override calculation part 6 may be configured to be integrated.

EXPLANATION OF REFERENCE NUMERALS

1 servomotor control device
2 position command creation part
3 stop determination part
5 static-friction correction amount calculation part
6 override calculation part (static-friction correction amount modification part)
12 servomotor
83 integrator
L1 position control loop
L2 speed control loop

What is claimed is:

1. A servomotor control device comprising:
   a position control loop for feedback controlling a position of a servomotor;
   a speed control loop for feedback controlling speed of the servomotor;
   a position command creation part that creates a position command value for the servomotor;
   a stop determination part that determines whether or not the servomotor is stopped;
   a static-friction correction amount calculation part that calculates a static-friction correction amount of the servomotor; and
   a static-friction correction amount modification part that performs a predetermined modification on the static-friction correction amount calculated by the static-friction correction amount calculation part, in a case of the servomotor stopping, and then starting to operate in the same direction as prior to stopping,
   wherein the static-friction correction amount modification part performs the predetermined modification based on the command acceleration of the servomotor and a second-order derivative of the position command value created by the position command creation part.

2. The servomotor control device according to claim 1, wherein the stop determination part determines whether or not the servomotor is stopped, using the position command value created by the position command creation part.

3. The servomotor control device according to claim 1, further comprising an integrator that calculates an integral term based on the speed of the servomotor in the speed control loop,
   wherein the static-friction correction amount calculated by the static-friction correction amount calculation part is added to the integral term calculated by the integrator.

4. The servomotor control device according to claim 1, wherein the static-friction correction amount calculated by the static-friction correction amount calculation part is added to the speed command value of the speed control loop.

5. The servomotor control device according to claim 1, wherein the static-friction correction amount modification part performs the predetermined modification by multiplying the second-order derivative of the position command value by the static-friction correction amount.

6. The servomotor control device according to claim 1, wherein the static-friction correction amount modification part performs the predetermined modification by multiplying the second-order derivative of the position command value by the static-friction correction amount, and further adding thereto an addition amount determined based on the command acceleration.

7. The servomotor control device according to claim 5, wherein the factor is proportional to the command acceleration.

8. The servomotor control device according to claim 5, wherein the factor is proportional to the square root of the command acceleration.

* * * * *